(12) United States Patent
Wang et al.

(10) Patent No.: US 12,203,365 B2
(45) Date of Patent: Jan. 21, 2025

(54) METHOD FOR EVALUATING ROCK DRILLABILITY BY NANO-INDENTATION TEST ON ROCK CUTTING

(71) Applicant: CHINA UNIVERSITY OF PETROLEUM (EAST CHINA), Qingdao (CN)

(72) Inventors: Zizhen Wang, Qingdao (CN); Xianbo Lei, Qingdao (CN); Weidong Zhou, Qingdao (CN); Chengwen Wang, Qingdao (CN); Ruihe Wang, Qingdao (CN); Xian Shi, Qingdao (CN); Luopeng Li, Qingdao (CN); Hongjian Ni, Qingdao (CN); Rui Zhang, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 353 days.

(21) Appl. No.: 17/883,616

(22) Filed: Aug. 9, 2022

(65) Prior Publication Data
US 2023/0228189 A1    Jul. 20, 2023

(30) Foreign Application Priority Data
Jan. 19, 2022    (CN) .......................... 202210057803.5

(51) Int. Cl.
*E21B 49/02*    (2006.01)
*G01N 3/42*    (2006.01)

(52) U.S. Cl.
CPC .............. *E21B 49/02* (2013.01); *G01N 3/42* (2013.01); *G01N 2203/0019* (2013.01); *G01N 2203/0286* (2013.01)

(58) Field of Classification Search
CPC .... E21B 49/02; E21B 2200/22; E21B 49/005; G01N 3/42; G01N 2203/0019;
(Continued)

(56) References Cited

U.S. PATENT DOCUMENTS

2019/0345809 A1*    11/2019    Jain ....................... E21B 44/005

FOREIGN PATENT DOCUMENTS

| CN | 110186755 A | * | 8/2019 | ............... G01N 1/32 |
| CN | 110399699 A | * | 11/2019 | ........... G01N 23/207 |

(Continued)

OTHER PUBLICATIONS

Li Chuanshan, et al., Study on Rock Drillability Evaluation by Elements' Contents in Cuttings, Drilling & Production Technology, 2018, pp. 25-26, vol. 41, No. 4.
(Continued)

*Primary Examiner* — Marrit Eyassu
(74) *Attorney, Agent, or Firm* — Bayramoglu Law Offices LLC

(57) ABSTRACT

A method for evaluating rock drillability by a nano-indentation test on a rock cutting includes: conducting a nano-indentation test on a rock cutting sample, acquiring a displacement-load curve of an indenter, and calculating a micro-hardness under the nano-indentation test; calculating mineral composition of the rock cutting sample based on a statistical distribution characteristic of the micro-hardness, and transforming the micro-hardness under the nano-indentation test on the rock cutting sample into a macro-hardness; and calculating a rock drillability grade characterized by the micro-hardness under the nano-indentation test on the rock cutting sample based on a correlation between the macro-hardness of the rock cutting sample and the rock drillability grade. In the context of few downhole rock samples and high cost, the method overcomes the limitation of sample size and
(Continued)

shape on conventional testing and solves the difficult problem of mechanical parameter testing of deep rocks.

5 Claims, 3 Drawing Sheets

(58) Field of Classification Search
CPC ..... G01N 2203/0286; G01N 2203/008; G01N 2203/0218; G01N 3/40; G06F 30/20; G06F 2119/14
USPC .......................................................... 73/104
See application file for complete search history.

(56) References Cited

FOREIGN PATENT DOCUMENTS

| | | |
|---|---|---|
| CN | 111999163 A | 11/2020 |
| CN | 112179769 A | 1/2021 |
| CN | 112179770 A | 1/2021 |
| CN | 113029746 A | 6/2021 |

OTHER PUBLICATIONS

Jia Suogang, et al., Research on the micro-scale method for testing the mechanical anisotropy of shale, Journal of Geomechanics, 2021, pp. 10-18, vol. 27, No. 1.

Sun Changlun, et al., Rheological characteristics of mineral components in sandstone based on nanoindentation, Chinese Journal of Rock Mechanics and Engineering, 2021, pp. 77-87, vol. 40, No. 1.

Shi Xian, et al., Investigation of mechanical properties of bedded shale by nanoindentation tests: A case study on Lower Silurian Longmaxi Formation of Youyang area in southeast Chongqing, China, Petroleum Exploration and Development, 2019, pp. 163-172, vol. 46, Issue 1.

Xian Shi, et al., Loading rate effect on the mechanical behavior of brittle longmaxi shale in nanoindentation, International Journal of Hydrogen Energy, 2019, pp. 6481-6490, vol. 44.

* cited by examiner

METHOD FOR EVALUATING ROCK DRILLABILITY BY NANO-INDENTATION TEST ON ROCK CUTTING

CROSS REFERENCE TO THE RELATED APPLICATIONS

This application is based upon and claims priority to Chinese Patent Application No. 202210057803.5, filed on Jan. 19, 2022, the entire contents of which are incorporated herein by reference.

TECHNICAL FIELD

The present disclosure belongs to the technical field of petroleum exploration and development, and in particular, relates to a method for evaluating rock drillability by a nano-indentation test on a rock cutting.

BACKGROUND

In oil and gas engineering, rock drillability refers to the ability of rock to resist breaking from being drilled by a drill bit of a certain size and type under certain drilling process conditions, which is closely related to the strength, hardness, elastoplasticity, abrasiveness and structural characteristics of the formation. It is an important parameter to guide geological stratification and drill bit selection and is of great significance to oil and gas drilling and prospecting.

There are many factors that affect rock drillability, and there are four different rock drillability evaluation methods at present.

(1) Rock drillability evaluation based on physical and mechanical properties of rock. One or more mechanical properties that can reflect the essence of rock broken are measured indoors by measuring instruments as an index of rock drillability. The process of measuring the indentation hardness is similar to the process of the drill bit penetrating into the rock under the axial load during drilling. This evaluation method is simple, and the measured index is relatively stable.

(2) Rock drillability evaluation based on modelled rate of penetration (ROP) with micro drilling rig. The simulation test is conducted indoors through micro equipment and tools, and the comprehensive index of a certain drilling condition and technology is reflected by the modelled ROP.

(3) Rock drillability evaluation based on actual ROP. This method can reflect the comprehensive influence of various factors, such as different formation rocks and technical processes, but the evaluation data can only be acquired during the actual drilling process.

(4) Rock drillability evaluation based on specific energy. This method calculates the ROP by the amount of rock broken per unit time through the view of energy consumption.

Currently, the rock drillability evaluation methods have great limitations. It is difficult to directly obtain the downhole formation rock, and the cost of downhole coring is very high. In addition, the physical and mechanical properties of the rock measured indoors are greatly affected by factors, such as rock shape and size. Therefore, the rock drillability evaluation method based on physical and mechanical properties of rock with a large number of destructive tests is not practical. The rock drillability evaluation method based on modelled ROP is limited by working conditions. The on-site drilling footage is as high as hundreds of meters, even thousands of meters, and the formation is changeable and heterogeneous. So the modelled ROP is not equal to the actual ROP, making it hard to reflect the actual effect. The actual ROP is restricted by many factors, such as drilling parameters, characteristic parameters of drilling tools, hydraulic parameters, technical level of drilling equipment and personnel, and others. Therefore, the rock drillability characterized by actual ROP is temporary and local. The specific energy can be used to compare the effectiveness of various drilling methods in breaking rock, but the specific energy of the various drilling methods is not a constant. Therefore, the change law of the rock drillability evaluation method based on specific energy needs to be further studied.

SUMMARY

In order to overcome the deficiencies of the prior art, the present disclosure aims to provide a method for evaluating rock drillability by a nano-indentation test on a rock cutting. The present disclosure establishes a relationship between a microscopic physical property of a rock cutting sample and rock drillability through a nano-indentation test that has low requirements for sample shape and size, thereby overcoming the limitations of sample size and shape on conventional testing. The present disclosure derives indentation load-depth curves at different scales, calculates a micromechanical parameter of rock, further establishes a relationship between the micromechanical parameter and the rock drillability and realizes rock drillability prediction.

To solve the above technical problem, the present disclosure provides the following technical solution. The method for evaluating rock drillability by a nano-indentation test on a rock cutting includes the following steps:

(1) conducting a nano-indentation test on a rock cutting sample, and calculating a micro-hardness of each indentation point of the rock cutting:

S10: preparing the rock cutting sample;

S20: conducting the nano-indentation test on the rock cutting sample, drawing a displacement-load curve of each indentation point, and deriving a maximum indentation load $P_m$ and a maximum indentation depth $h_m$ of the rock cutting sample; and S30: calculating, based on the maximum indentation load and the maximum indentation depth, the micro-hardness of each indentation point of the rock cutting sample, and deriving a distribution position of each indentation point;

where, the micro-hardness of an indentation point under the nano-indentation test on the rock cutting sample is calculated as follows:

$$H_n = \frac{P_m}{A_c} \quad (1)$$

$$A_c = 24.56 h_c^2 \quad (2)$$

where, $H_n$ denotes the micro-hardness of the indentation point under the nano-indentation test on the rock cutting sample, Pa; $P_m$ denotes the maximum indentation load applied in the nano-indentation test, N; $A_c$ denotes a projected area of a contact zone between an indenter and the rock cutting sample, m²; and $h_c$ denotes an indentation depth, m;

(2) calculating the proportions of each mineral component of the rock cutting sample, and establishing a transformation relationship between the micro-hardness under the nano-indentation test and a macro-hardness, where the rock cutting sample is a combination of various mineral components in different proportions, so the micro-hardness varies obviously at different indentation points based on the different proportions of the mineral components under the nano-indentation test on the rock cutting sample;

the macro-hardness of the whole rock cutting sample is calculated as follows:

$$H = \sum_{i=1}^{p} \rho_i H_i \tag{3}$$

where, H denotes the macro-hardness of the rock cutting sample, Pa; p denotes a category number of mineral components constituting the rock cutting sample; $\rho_i$ denotes a weight of an i-th mineral component; and $H_i$ denotes the micro-hardness of the i-th mineral component reflected by the nano-indentation test, Pa;

(3) establishing a regression model between the micro-hardness of the rock cutting sample under the nano-indentation test and rock drillability based on a relationship between the macro-hardness of the rock cutting sample, the micro-hardness under the nano-indentation test, and the rock drillability;

establishing a regression model between the macro-hardness of the rock cutting sample and the rock drillability:

$$k_d = aH + b \tag{4}$$

where, $k_d$ denotes the rock drillability for a roller cone bit; H denotes the macro-hardness of the rock cutting sample, MPa; and a and h denote regression coefficients;

substituting Eq. (4) into Eq. (3) to obtain the regression model between the micro-hardness of the rock cutting sample under the nano-indentation test and the rock drillability:

$$k_d = a\sum_{i=1}^{p} \rho_i H_i + b \tag{5}$$

where, $k_d$ denotes the rock drillability for the roller cone bit; p denotes the category number of mineral components constituting the rock cutting sample; $\rho_i$ denotes the weight of the i-th mineral component; $H_i$ denotes the micro-hardness of the i-th mineral component reflected by the nano-indentation test, MPa; and a and b denote the regression coefficients.

In a further technical solution, in step S10, the rock cutting sample may be specifically prepared as follows:

S11: collecting a target rock cutting, and grinding the target rock cutting to a size of a mold, so as to obtain a rock cutting with a diameter Φ<25 mm and a height h<20 mm;

S12: inserting the ground rock cutting into the mold, injecting epoxy resin to fully contact the rock cutting, letting the rock cutting stand for 24 hours or more, and obtaining a cemented rock cutting sample after the epoxy resin is completely consolidated;

S13: de-molding the cemented rock cutting sample, and polishing a loading surface of the rock cutting sample by a polishing machine so as to remove the epoxy resin on the loading surface of the rock cutting sample;

S14: subjecting the rock cutting sample polished in step S13 to secondary grinding by a sand disc and a diamond suspension until the diamond suspension is gradually fined from 9 μm and 3 μm to 1 μm in terms of particle size, such that upper and lower end surfaces of the rock cutting sample are parallel to each other, and the loading surface becomes a smooth, high-quality interface; and S15: surface-cleaning the rock cutting sample ground in step S14 with an organic solvent, drying the rock cutting sample in an oven to form the rock cutting sample, and sealing the rock cutting sample for storage.

In a further technical solution, in step S20, the nano-indentation test specifically may include: loading the rock cutting sample by the indenter at a constant loading rate of 20 N/min until a maximum load of 400 μN, then unloading, deriving load and loading depth changes, and drawing displacement-load curves for 200 indentation points under the nano-indentation test.

In a further technical solution, step (2) specifically may include:

S21: drawing a frequency distribution histogram of the micro-hardness under the nano-indentation test based on the calculation results, conducting peak analysis, and calculating an interval weight, where each peak in the frequency distribution histogram represents a mineral component; the micro-hardness is reasonably divided into different intervals according to the peak; and since each mineral component has a different micro-hardness range, ranges of the divided intervals can be different;

S22: calculating a weighted mean of each interval as a micro-hardness of the mineral component; and S23: weighing and calculating the macro-hardness of the rock cutting sample according to a micro-hardness calculation result of each mineral component;

where, the weight of the mineral component of the rock cutting sample may be calculated as follows:

$$\rho_i = \frac{N_i}{N_0} \tag{7}$$

where, $N_i$ denotes a number of indentation points in the micro-hardness interval of the i-th mineral component; and $N_0$ denotes a total number of indentation points of the rock cutting sample;

the micro-hardness of a mineral component of the rock cutting sample may be calculated as follows:

$$H_i = \frac{\sum_{j=1}^{m} H_{j\text{-}avg}}{m} = \frac{\sum_{j=1}^{m}\left(\sum_{n=1}^{n_j} H_n / n_j\right)}{m} \tag{6}$$

where, $H_i$ denotes the micro-hardness of the i-th mineral component reflected by the nano-indentation test, Pa; m denotes a number of secondary intervals divided in the micro-hardness interval of the i-th mineral component, preferably 3 to 5; $n_j$ denotes a number of indentation points in a j-th secondary interval, $n_j \neq 0$; $H_{j\text{-}avg}$ denotes an arithmetic average of the micro-hardness in the j-th secondary interval; and $N_i$ denotes the number of indentation points in the micro-hardness interval of the i-th mineral component, $$N_i = \sum_{j=1}^{m} n_j.$$

The present disclosure has the following beneficial effects. The present disclosure uses the nano-indentation test to overcome the size and shape limitations of the conventional rock mechanics test. The present disclosure derives indentation load-depth curves at different scales, calculates the micromechanical parameter of rock, and further establishes the relationship between the micromechanical parameter and the rock drillability. The present disclosure realizes rock drillability prediction and provides basic parameter basis for the drilling of deep wells, ultra-deep wells, and unconventional oil and gas reservoirs.

DETAILED DESCRIPTION OF THE EMBODIMENTS

Specific implementations of the embodiments of the present disclosure are described below with reference to the drawings. It should be understood that the implementations described herein are merely intended to illustrate and interpret the present disclosure, rather than to limit the present disclosure.

Figure 1:
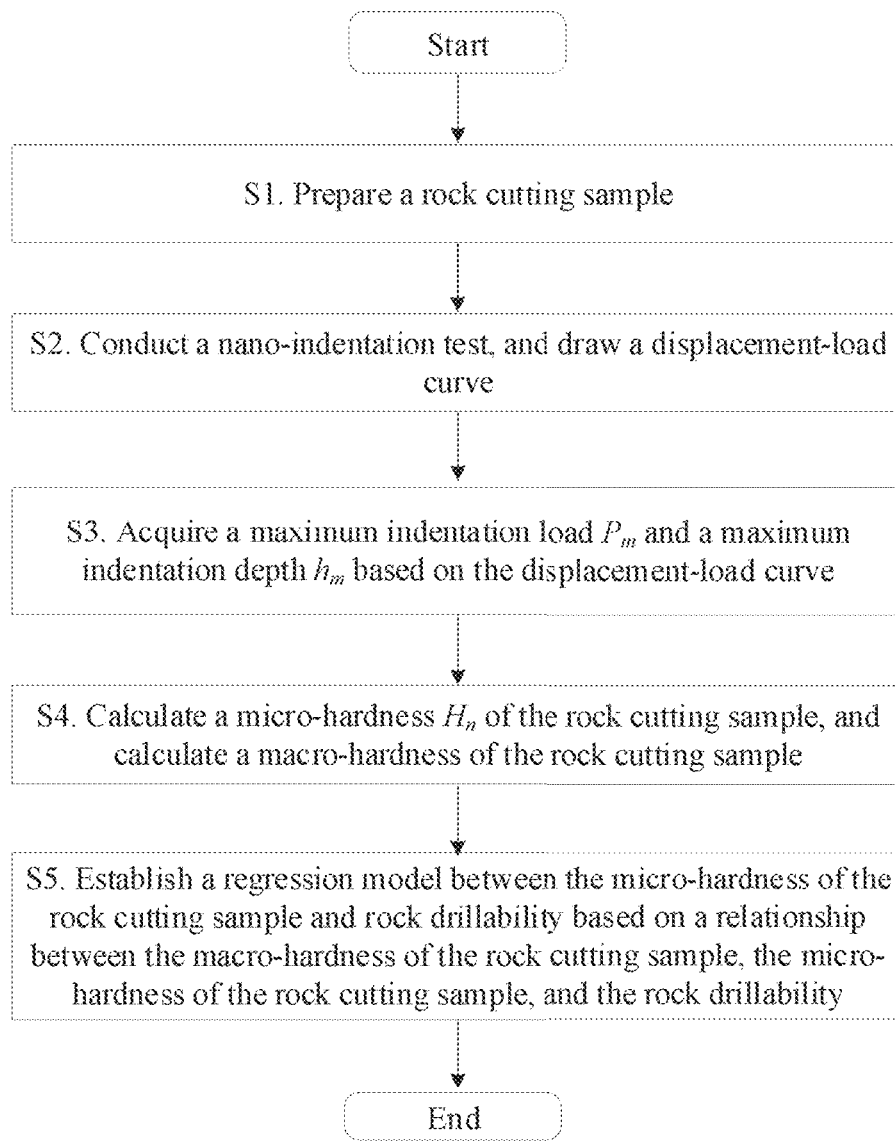
FIG. 1 is a flowchart of a method for evaluating rock drillability by a nano-indentation test on a rock cutting according to the present disclosure.
Figure 2:
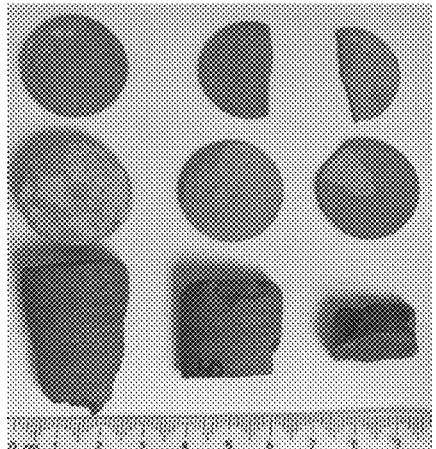
FIG. 2 shows collected rock cuttings.
Figure 3:
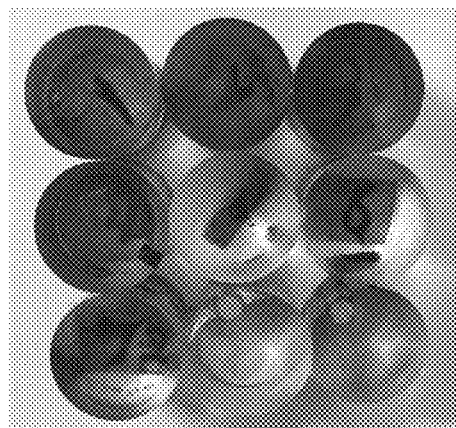
FIG. 3 shows prepared rock cutting samples.
Figure 4:
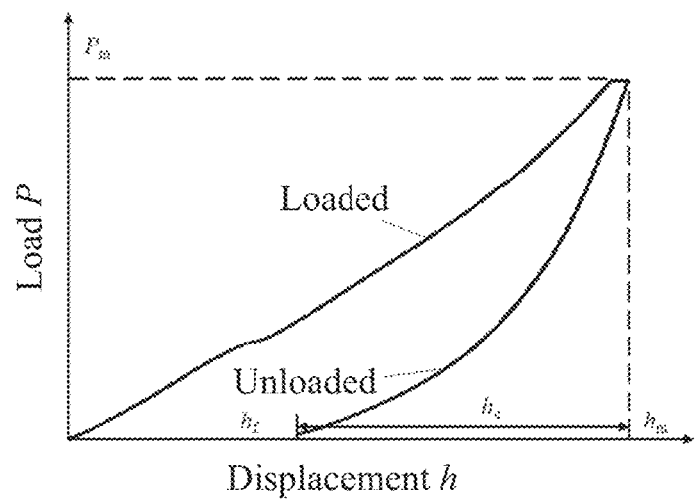
FIG. 4 is a displacement-load curve during loading and unloading.
Figure 5:
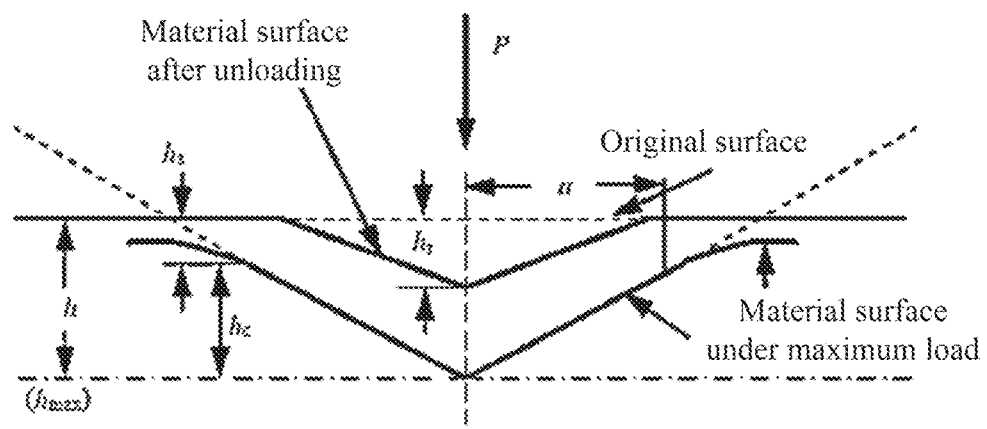
FIG. 5 shows a surface deformation of the rock cutting sample under different loading and unloading states.

A method for evaluating rock drillability by a nano-indentation test on a rock cutting includes the following steps: S11: Collect a target rock cutting, and grind the target rock cutting to a size of a mold, so as to obtain a rock cutting with a diameter $\Phi<25$ mm and a height $h<20$ mm. There should be no obvious cracks on the surface of the polished rock cutting, as shown in FIG. 3.

S12: Insert the ground rock cutting into the mold, inject epoxy resin to fully contact the rock cutting, let the rock cutting stand for 24 hours or more, obtain a cemented rock cutting sample after the epoxy resin is completely consolidated, surface-clean the rock cutting sample with an organic solvent, dry the rock cutting sample to form the rock cutting sample, and seal the rock cutting sample for storage.

S13: De-mold the cemented rock cutting sample and polish a loading surface of the rock cutting sample by a polishing machine so as to remove the epoxy resin on the loading surface of the rock cutting sample.

S14: Subject the rock cutting sample polished by the polishing machine to secondary grinding by a sand disc and a diamond suspension until the diamond suspension is gradually fined from 9 μm and 3 μm to 1 μm in terms of particle size, such that upper and lower end surfaces of the rock cutting sample are parallel to each other, and the loading surface becomes a smooth, high-quality interface.

S15: Surface-clean the rock cutting sample ground in step S14 with an organic solvent, dry the rock cutting sample in an oven to form the rock cutting sample, and seal the rock cutting sample for storage.

S16: Carry out a nano-indentation test with a diamond indenter, load the rock cutting sample at a constant loading rate of 20 N/min to a maximum load of 1,000 μN, unload, and automatically record load and loading depth changes in a system.

Figure 6:
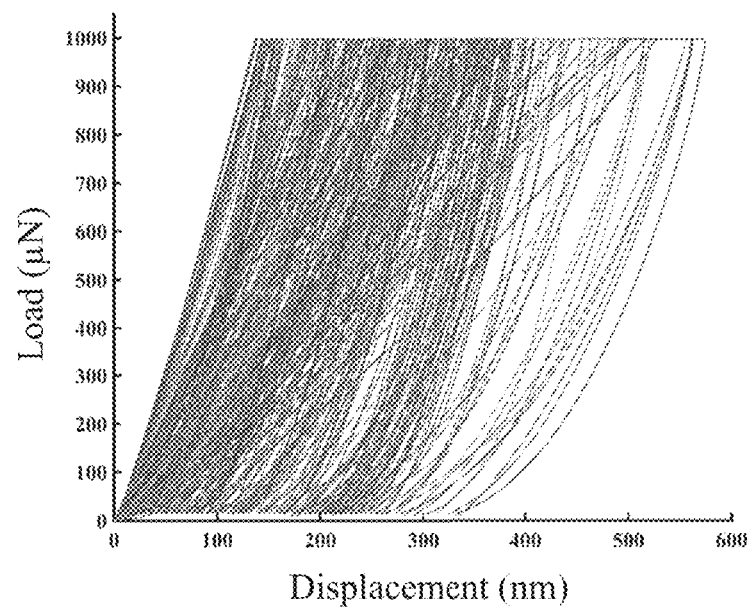
FIG. 6 shows a displacement-load curve in the nano-indentation test.
Figure 7:
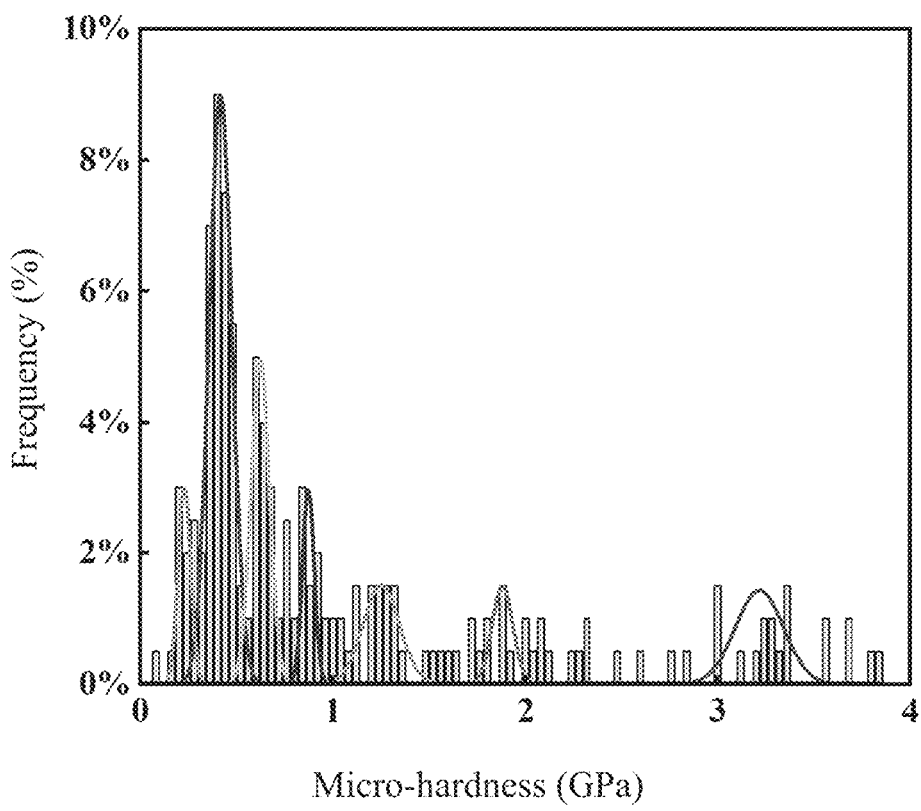
FIG. 7 shows an analysis of a micro-hardness peak at each indentation point in the nano-indentation test.

S17: Indent multiple times by the indenter by a lattice method on the loading surface of the rock cutting sample and derive displacement-load curves for a total of 200 indentation points, as shown in FIG. 6.

S18: Determine a maximum indentation load $P_m$ and a maximum indentation depth $h_m$ on the displacement-load curve, and calculate the micro-hardness of the rock cutting sample corresponding to the displacement-load curve of each indentation point.

$$H_n = \frac{P_m}{A_c} \tag{1}$$

$$A_c = 24.56 h_c^2 \tag{2}$$

In the Eqs., $H_n$ denotes the micro-hardness of the indentation point under the nano-indentation test on the rock cutting sample, Pa; $P_m$ denotes the maximum indentation load applied in the nano-indentation test, N; $A_c$ denotes a projected area of a contact zone between an indenter and the rock cutting sample, m²; and $h_c$ denotes an indentation depth, m.

S21: Draw a frequency distribution histogram of the micro-hardness based on the calculation results, conduct peak analysis, and calculate an interval weight, where each peak in the frequency distribution histogram represents a mineral component, and the micro-hardness is reasonably divided into different intervals according to the peak.

The interval weight is calculated as follows:

$$\rho_i = \frac{N_i}{N_0} \tag{7}$$

where, $N_i$ denotes a number of indentation points in the micro-hardness interval of the i-th mineral component, and $N_0$ denotes a total number of indentation points of the rock cutting sample.

S22: Calculate a weighted mean of each interval as a micro-hardness of the mineral component.

The micro-hardness of the mineral component of the rock cutting sample is calculated as follows:

$$H_i = \frac{\sum_{j=1}^{m} H_{j\text{-}avg}}{m} = \frac{\sum_{j=1}^{m}\left(\sum_{n=1}^{n_j} H_n/n_j\right)}{m} \tag{6}$$

where, $H_i$ denotes the micro-hardness of the i-th mineral component reflected by the nano-indentation test, Pa; m denotes a number of secondary intervals divided in the micro-hardness interval of the i-th mineral component, preferably 3 to 5; $n_j$ denotes a number of indentation points in a j-th secondary interval, $n_j \neq 0$; $H_{j\text{-}avg}$ denotes an arithmetic average of the micro-hardness in the j-th secondary interval; and $N_i$ denotes the number of indentation points in the micro-hardness interval of the i-th mineral component, $$N_i = \sum_{j=1}^{m} n_j.$$

S23: Weigh and calculate the macro-hardness of the rock cutting sample according to a micro-hardness calculation result of each mineral component.

$$H = \sum_{i=1}^{p} \rho_i H_i \qquad (3)$$

where, H denotes the macro-hardness of the rock cutting sample, Pa; p denotes a category number of mineral components constituting the rock cutting sample; $\rho_i$ denotes a weight of an i-th mineral component; and $H_i$ denotes the micro-hardness of the i-th mineral component reflected by the nano-indentation test, Pa.

S31: Establish a regression model between the micro-hardness of the rock cutting sample and rock drillability based on a relationship between the macro-hardness of the rock cutting sample, the micro-hardness under the nano-indentation test, and the rock drillability; and calculate a rock drillability grade.

The regression model between the macro-hardness of the rock cutting sample and the rock drillability is:

$$k_d = 0.0006H + 5.2648 \qquad (8)$$

Eq. (3) is substituted into Eq. (8) to obtain the regression model between the micro-hardness of the rock cutting sample and the rock drillability:

$$k_d = 0.0006 \sum_{1}^{i} \rho_i H_i + 5.2648 \qquad (9)$$

where, $k_d$ denotes the rock drillability for the roller cone bit; i denotes the categories of mineral components; $\rho_i$ denotes the weight of the i-th mineral component; and $H_i$ denotes the micro-hardness of the i-th mineral component reflected by the nano-indentation test, MPa.

S32: Derive a rock drillability result according to the above parameters, as shown in Table 1.

TABLE 1

Rock drillability evaluated by the nano-indentation test

| Interval/ GPa | Weighted mean hardness within the interval $H_i$/GPa | Interval weight $r_i$ | Micro-hardness H/GPa | Drillability grade $k_d$ |
| --- | --- | --- | --- | --- |
| (0.06, 0.36) | 0.26 | 0.114 | 0.946 | 5.8324 |
| (0.36, 0.56) | 0.44 | 0.332 | | |
| (0.56, 0.76) | 0.65 | 0.152 | | |
| (0.76, 1.12) | 0.90 | 0.147 | | |
| (1.12, 1.36) | 1.25 | 0.082 | | |
| (1.72, 2.36) | 2.01 | 0.103 | | |
| (3.00, 3.40) | 3.23 | 0.071 | | |

TABLE 2

Peak micro-hardness at the indentation point

| SN | Type | Fitted peak area | Full width at half maximum (FWHM) | Maximum height | Weighted mean center (WMC) | Fitted peak area percentage |
| --- | --- | --- | --- | --- | --- | --- |
| 1 | Gaussian | 0.00246 | 0.07718 | 0.02996 | 0.22808 | 7.22389 |
| 2 | Gaussian | 0.01333 | 0.1394 | 0.08985 | 0.4153 | 39.13276 |
| 3 | Gaussian | 0.00597 | 0.11314 | 0.04961 | 0.62171 | 17.53742 |
| 4 | Gaussian | 0.00226 | 0.07177 | 0.02958 | 0.87177 | 6.63379 |
| 5 | Gaussian | 0.00356 | 0.22241 | 0.01505 | 1.25084 | 10.46078 |
| 6 | Gaussian | 0.00202 | 0.12709 | 0.01493 | 1.87998 | 5.92794 |
| 7 | Gaussian | 0.00446 | 0.29327 | 0.01428 | 3.21631 | 13.08342 |

What is claimed is:

1. A method for evaluating a rock drillability by a nano-indentation test on a rock cutting, comprising the following steps:

(1) conducting a nano-indentation test comprising of a plurality of indentation points on a rock cutting sample, and calculating a micro-hardness of each of indentation points of the rock cutting sample:

wherein, the micro-hardness of each of the indentation points under the nano-indentation test on the rock cutting sample is calculated as follows:

$$H_n = \frac{P_m}{A_c} \qquad (1)$$

$$A_c = 24.56h_c^2 \qquad (2)$$

wherein, $H_n$ denotes the micro-hardness of each of the indentation points under the nano-indentation test on the rock cutting sample, Pascal (Pa); $P_m$ denotes a maximum indentation load applied in the nano-indentation test, Newton (N); $A_c$ denotes a projected area of a contact zone between an indenter and the rock cutting sample, meter square (m²); and he denotes an indentation depth, meter (m);

(2) calculating a proportion of each of mineral components of the rock cutting sample, and establishing a transformation relationship between the micro-hardness of each of indentation points of the rock cutting sample under the nano-indentation test and a macro-hardness, wherein the rock cutting sample is a combination of the mineral components in different proportions, and the micro-hardness of each of indentation points of the rock cutting sample varies at different indentation points based on the different proportions of the mineral components under the nano-indentation test on the rock cutting sample;

the macro-hardness of the rock cutting sample is calculated as follows:

$$H = \sum_{i=1}^{p} \rho_i H_i \qquad (3)$$

wherein, H denotes the macro-hardness of the rock cutting sample, Pa; p denotes a category number of the mineral components constituting the rock cutting sample; $\rho_i$ denotes a weight of an i-th mineral component of the mineral components; and $H_i$ denotes a micro-hardness of the i-th indentation points under the nano-indentation test on the rock cutting sample, Pa; and (3) establishing a regression model between the calculated micro-hardness of the rock cutting sample under the nano-indentation test and a rock drillability based on a relationship between the macro-hardness of the rock cutting sample, the micro-hardness under the nano-indentation test, and the rock drillability;

wherein a regression model between the macro-hardness of the rock cutting sample and the rock drillability is as follows:

$$k_d = aH + b \qquad (4)$$

wherein, $k_d$ denotes the rock drillability for a roller cone bit; H denotes the macro-hardness of the rock cutting sample, Mega Pascal (MPa); and a and b denote regression coefficients.

2. The method according to claim 1, wherein in step (1), the rock cutting sample is specifically prepared as follows:

S11: collecting a target rock cutting, and grinding the target rock cutting to a size of a mold to obtain a ground rock cutting with a diameter Φ<25 mm and a height h<20 mm;

S12: inserting the ground rock cutting into the mold, injecting epoxy resin to fully contact the ground rock cutting, letting the ground rock cutting stand for at least 24 hours, and obtaining a cemented rock cutting sample after the epoxy resin is completely consolidated;

S13: de-molding the cemented rock cutting sample, and polishing a loading surface of the cemented rock cutting sample by a polishing machine to remove the epoxy resin on the loading surface of the cemented rock cutting sample to obtain a polished rock cutting sample;

S14: subjecting the polished rock cutting sample in step S13 to a secondary grinding by a sand disc and a diamond suspension until the diamond suspension is fined from 9 μm and 3 μm to 1 μm in terms of a particle size to obtain a further-ground rock cutting sample, wherein an upper end surface of the further-ground rock cutting sample and a lower end surface of the further-ground rock cutting sample are parallel to each other, and a loading surface of the further-ground rock cutting sample becomes a smooth interface; and S15: surface-cleaning the further-ground rock cutting sample in step S14 with an organic solvent, drying the further-ground rock cutting sample in an oven to form the rock cutting sample, and sealing the rock cutting sample for storage.

3. The method according to claim 1, wherein in step (1), the nano-indentation test specifically comprises: loading the rock cutting sample by the indenter at a constant loading rate of 20 N/min until a maximum load of 400 μN, then unloading, deriving a load and loading depth changes, and drawing displacement-load curves for 200 indentation points under the nano-indentation test.

4. The method according to claim 1, wherein step (2) specifically comprises:

S21: drawing a frequency distribution histogram of the micro-hardness under the nano-indentation test based on a calculation result, conducting a peak analysis, and calculating an interval weight, wherein each peak in the frequency distribution histogram represents a mineral component; the micro-hardness is reasonably divided into different intervals according to the peak; and since each of the mineral components has a different micro-hardness range, ranges of the divided intervals are allowed to be different;

S22: calculating a weighted mean of each of the divided intervals as the micro-hardness of each of the mineral components; and S23: weighing and calculating the macro-hardness of the rock cutting sample according to a micro-hardness calculation result of each of the mineral components;

wherein, the weight of each of the mineral components of the rock cutting sample is calculated as follows:

$$\rho_i = \frac{N_i}{N_0} \qquad (7)$$

wherein, $N_i$ denotes a number of indentation points in a micro-hardness interval of the i-th mineral component; and $N_0$ denotes a total number of the indentation points of the rock cutting sample;

the micro-hardness of each of the mineral components of the rock cutting sample is calculated as follows:

$$H_i = \frac{\sum_{j=1}^{m} H_{j\text{-}avg}}{m} = \frac{\sum_{j=1}^{m}\left(\sum_{n=1}^{n_j} H_n / n_j\right)}{m} \qquad (6)$$

wherein, $H_i$ denotes the micro-hardness of the i-th mineral component reflected by the nano-indentation test, Pa; m denotes a number of secondary intervals divided in the micro-hardness interval of the i-th mineral component; $n_j$ denotes a number of indentation points in a j-th secondary interval of the secondary intervals, $n_j \neq 0$; $H_{j\text{-}avg}$ denotes an arithmetic average of a micro-hardness in the j-th secondary interval; and $N_i$ denotes the number of the indentation points in the micro-hardness interval of the i-th mineral component, $$N_i = \sum_{j=1}^{m} n_j.$$

5. The method according to claim 1, wherein in step (3), the regression model between the micro-hardness of the rock cutting sample under the nano-indentation test and the rock drillability is:

$$k_d = a\sum_{i=1}^{p} \rho_i H_i + b \tag{5}$$

wherein, $k_d$ denotes the rock drillability for a roller cone bit; p denotes the category number of the mineral components constituting the rock cutting sample; $\rho_i$ denotes the weight of the i-th mineral component; $H_i$ denotes the micro-hardness of the i-th mineral component reflected by the nano-indentation test, MPa; and a and b denote the regression coefficients.

* * * * *